(No Model.)
V. LE BRUN.
POCKET BOOK.
No. 510,072.   Patented Dec. 5, 1893.
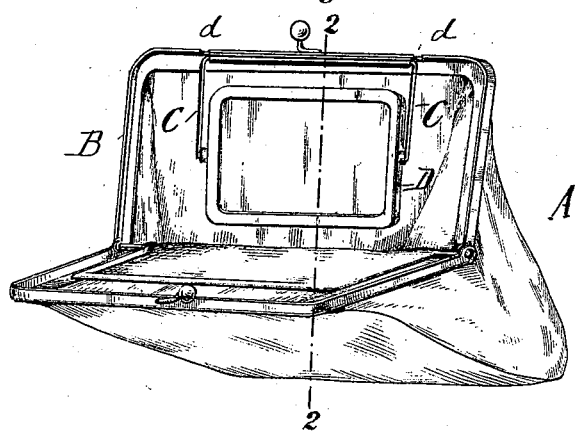
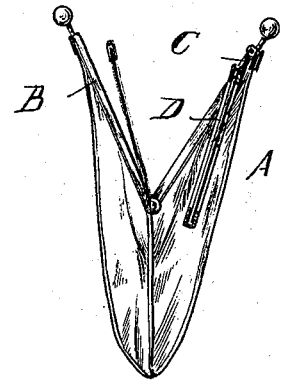
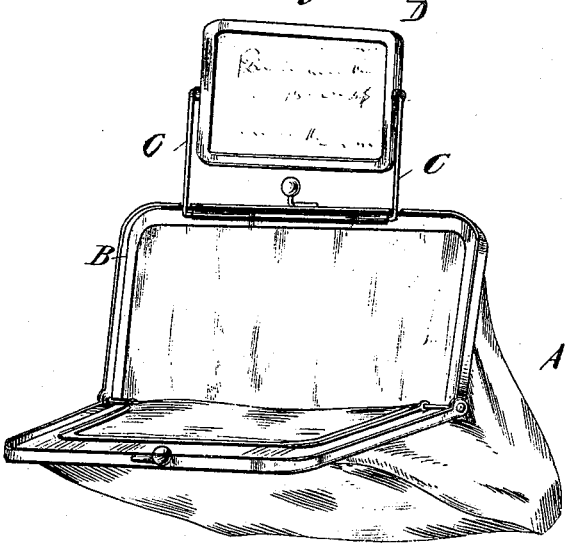
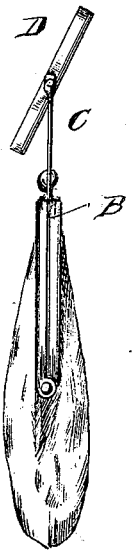
WITNESSES:
Marion Hall
Charles Schroeder.
INVENTOR
V. Le Brun.
BY Goepel & Rueginer
ATTORNEYS.

UNITED STATES PATENT OFFICE.

VICTOR LE BRUN, OF PARIS, FRANCE, ASSIGNOR TO GEORGE BORGFELDT & CO., OF NEW YORK, N. Y.

POCKET-BOOK.

SPECIFICATION forming part of Letters Patent No. 510,072, dated December 5, 1893.

Application filed May 17, 1892. Serial No. 433,265. (No model.)

*To all whom it may concern:*

Be it known that I, VICTOR LE BRUN, a citizen of the Republic of France, and a resident of the city of Paris, in the Republic of France, have invented certain new and useful Improvements in Pocket-Books, Satchels, &c., of which the following is a specification.

This invention relates to an improved mirror-attachment to pocket-books, satchels, &c., whereby a small pocket mirror can be readily removed from its position at the interior of the pocket-book, satchel or other inclosure to the outside of the same, so as to be used in a convenient manner and then to be returned to the inside of the pocket book after use; and the invention consists of a pocket-book, satchel or other inclosure, to one jaw of which are hinged supporting arms, to the ends of which is pivoted the frame of a mirror that can be turned on its axis on said arms, said mirror being readily moved outside of the frame and the arms retained in the recesses of the jaw when the mirror is to be used or returned into the pocket-book, satchel or other inclosure after use.

In the accompanying drawings, Figure 1 represents a perspective view of a pocket-book with my improved mirror-attachment, showing the same in position at the interior of the same. Fig. 2 is a vertical transverse section on line 2 2, Fig. 1. Fig. 3 is a perspective view of a pocket-book, showing the mirror moved to the outside of the same, and Fig. 4 is an end view of the pocket-book, showing the mirror held on the outside of the same by the frame.

Similar letters of reference indicate corresponding parts.

Referring to the drawings, A represents a pocket-book, satchel or other inclosure and B the frame of the same. To one jaw of the frame B are pivoted two arms C that support the frame of the mirror D, said mirror being centrally pivoted to the outer ends of the arms C, as shown in Figs. 1 and 3. The back of the mirror is preferably covered by a suitable protecting layer of paper, parchment or other suitable material, the parchment layer being used for making memoranda on the same, while it also protects the rear side of the mirror against injury. The jaw to which the arms C are pivoted is provided with recesses $d$ so that when the mirror is moved outside of the pocket-book, satchel or other inclosure, the arms fit into the recesses and are held by the frame when closing the jaws, as the arms are then firmly retained in position. The mirror may be conveniently used, as the pocket-book forms a convenient handle or support for the same. After use, the frame is opened and the mirror returned into the inside of the pocket-book, satchel or other inclosure by swinging the arms downward through the mouth of the frame to the interior of the pocket-book, &c., the mirror being so turned that its face is toward the wall of the pocket-book, &c., so that any articles placed into the inclosure are brought in contact with the protecting layer of the mirror. By this mirror-attachment ladies have a small mirror handy for use whenever required, which can be readily moved to the outside of the pocket-book, satchel or other article or back into the same, as required.

The word "bag" in the claims is to be understood as including the body of a pocket book or satchel and the word "frame" is to be construed as including any suitable pivoted support for the mirror.

Having thus described my invention, what I claim as new, and desire to secure by Letters Patent, is—

1. The combination of a bag, two pivoted jaws set in the mouth thereof, a frame pivoted to one of said jaws, and a mirror supported in said frame.

2. The combination of a bag, two pivoted jaws set in the mouth thereof, a frame pivoted to one of said jaws, and a mirror swiveled in said frame.

3. The combination of a bag, two pivoted jaws set in the mouth thereof, a frame pivoted on an inner face of one of said jaws, and a mirror supported in said frame.

4. The combination of a bag, two pivoted jaws set in the mouth thereof, a frame pivoted to an inner face of one of said jaws, and a mirror swiveled in said frame.

5. The combination of a bag, two pivoted jaws set in the mouth thereof, one of said jaws being provided with notches, a frame pivoted to an inner face of one of said jaws opposite said notches, and a mirror supported in said frame.

In testimony that I claim the foregoing as my invention I have signed my name in presence of two subscribing witnesses.

VICTOR LE BRUN.

Witnesses:
ROBT. M. HOOPER,
L. P. TWYEFFORT.